United States Patent
Brech

[15] 3,688,565
[45] Sept. 5, 1972

[54] ULTRASONIC THICKNESS GAUGE
[72] Inventor: Kilian H. Brech, Newhope, Pa.
[73] Assignee: Sonic Instruments, Incorporated, Trenton, N.J.
[22] Filed: Sept. 28, 1970
[21] Appl. No.: 76,180

[52] U.S. Cl. ................................... 73/67.9
[51] Int. Cl. ............................... G01n 29/00
[58] Field of Search ....73/67.7, 67.8 R, 67.9, 67.5 R, 73/67.6

[56] References Cited
UNITED STATES PATENTS 2,612,772  10/1952  McConnell ................. 73/67.5
3,554,014  1/1971  Berg et al ................. 73/67.8 R

*Primary Examiner*—James J. Gill
*Attorney*—Delio and Montgomery

[57] ABSTRACT

This disclosure relates to an ultrasonic thickness gauge in which the thickness of a test object is compared with the thickness of an object of known thickness and of the same material. The instrument provides an output indicative of the thickness of the test object by generating a signal which is inversely porportional to the thickness of one object and directly proportional to the thickness of the other object. Use of an object of known thickness as a calibration measurement permits the system to be self-calibrating for different materials.

21 Claims, 8 Drawing Figures

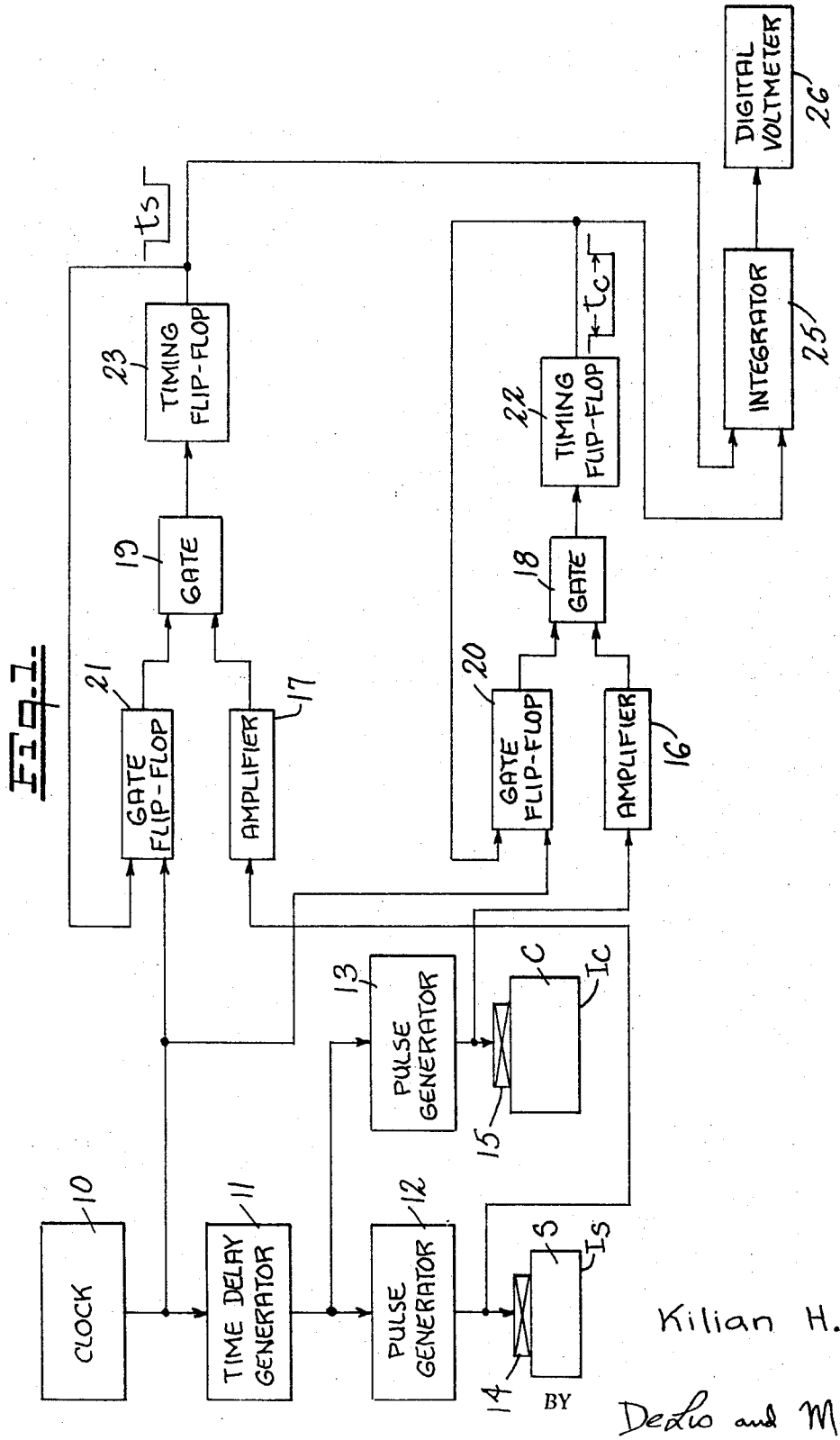

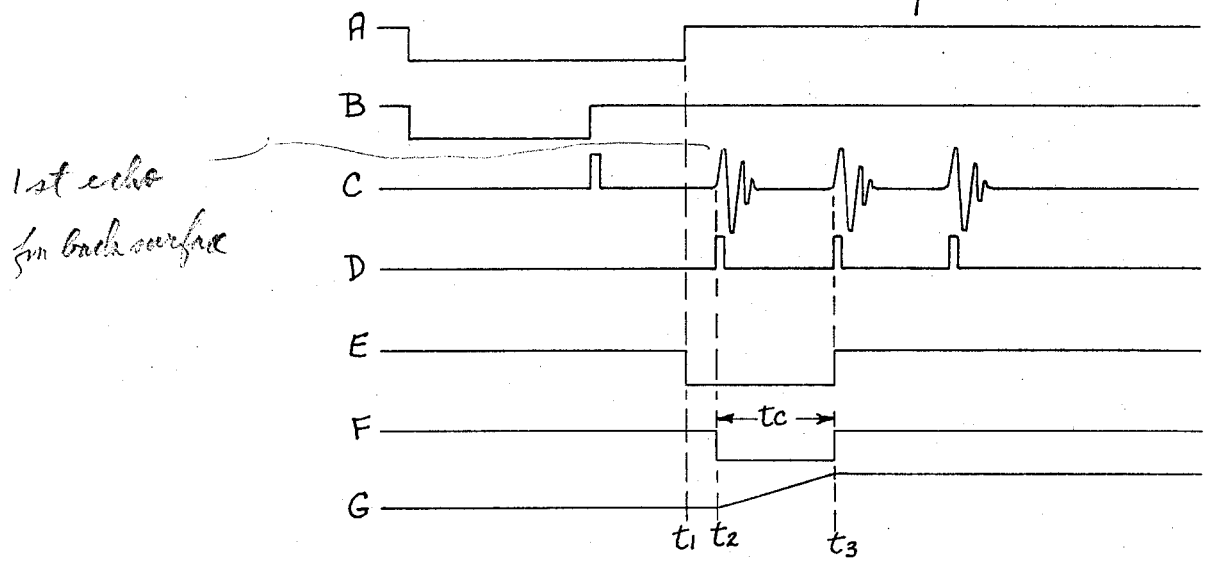
1st echo from back surface
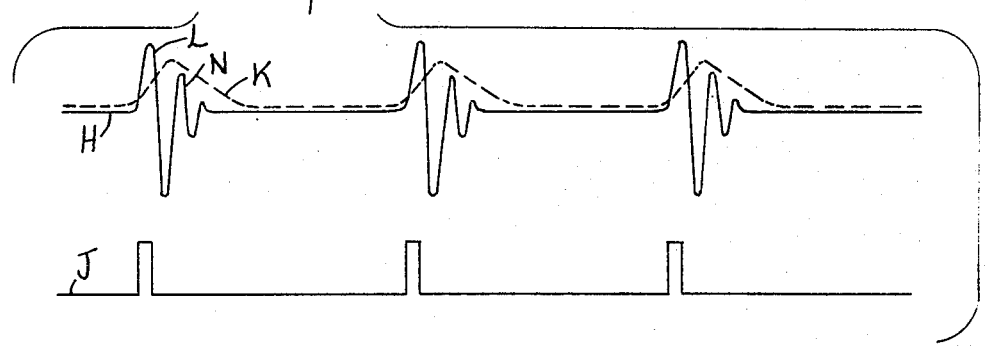
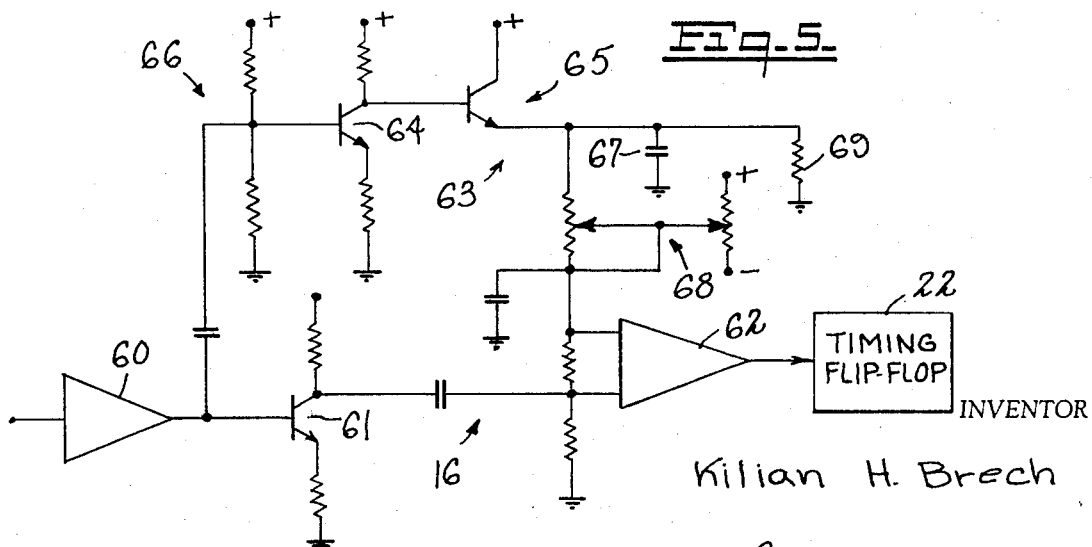
INVENTOR
Kilian H. Brech
BY Delio and Montgomery
ATTORNEYS

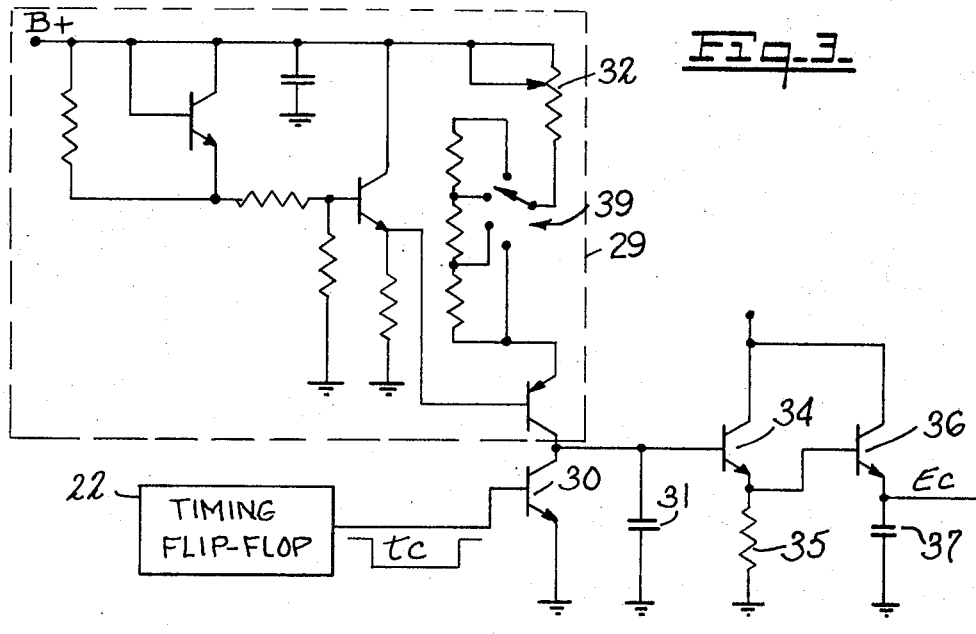
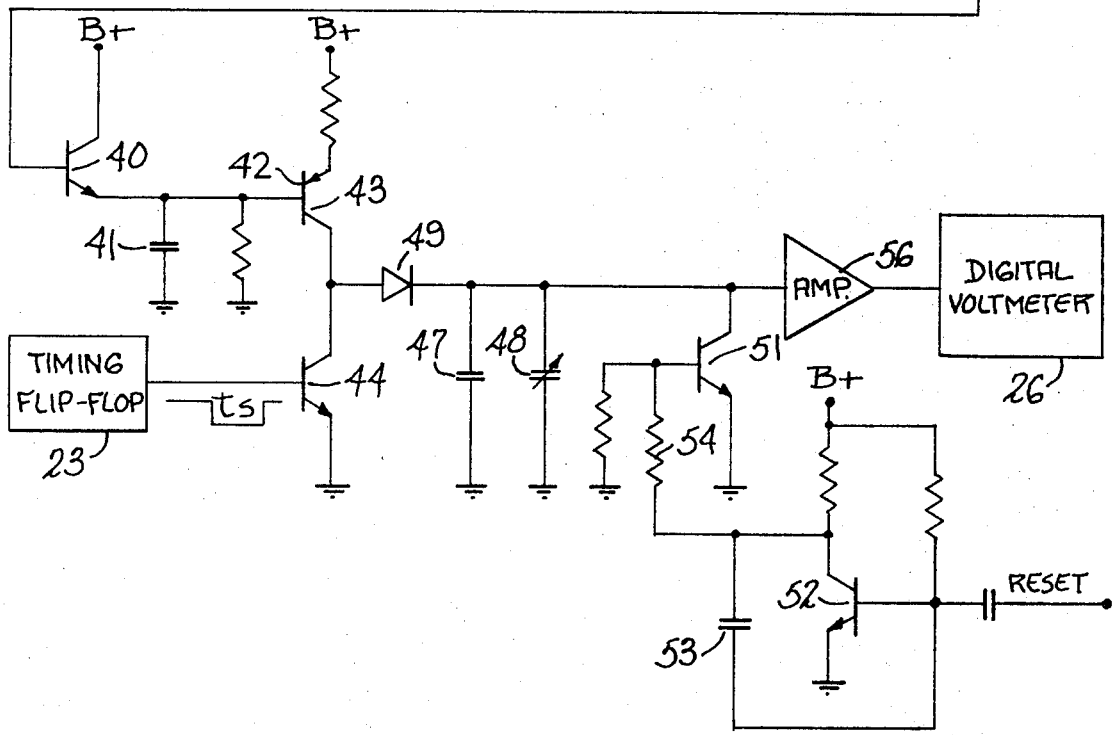
Fig.3.
INVENTOR
Kilian H. Brech
BY DeLio and Montgomery
ATTORNEYS

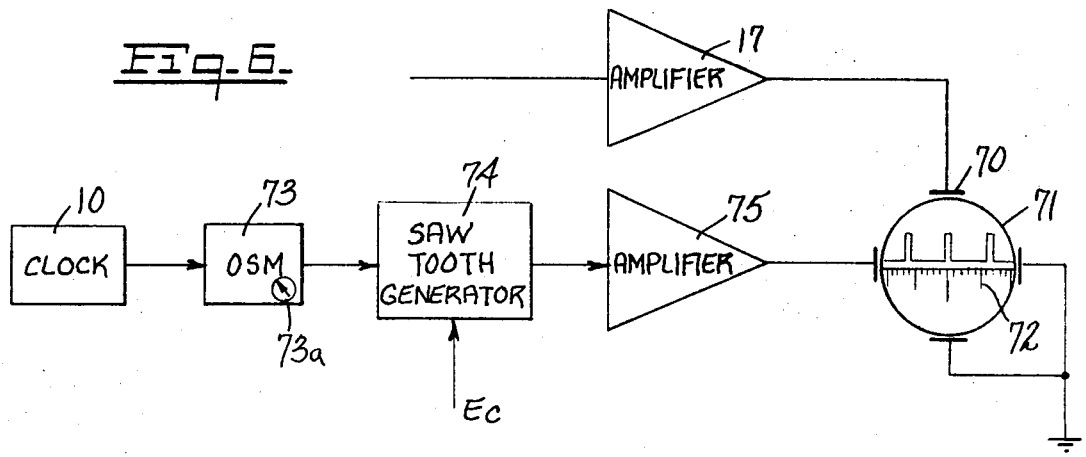
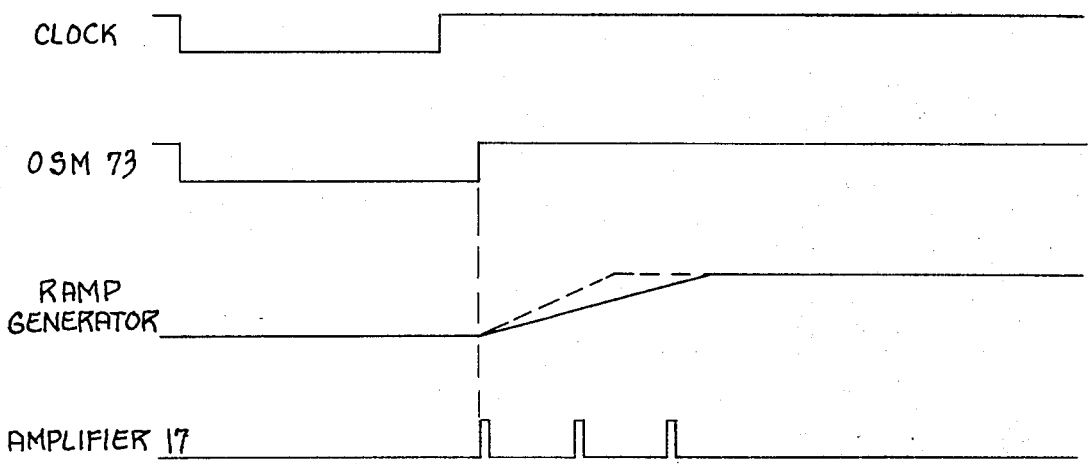
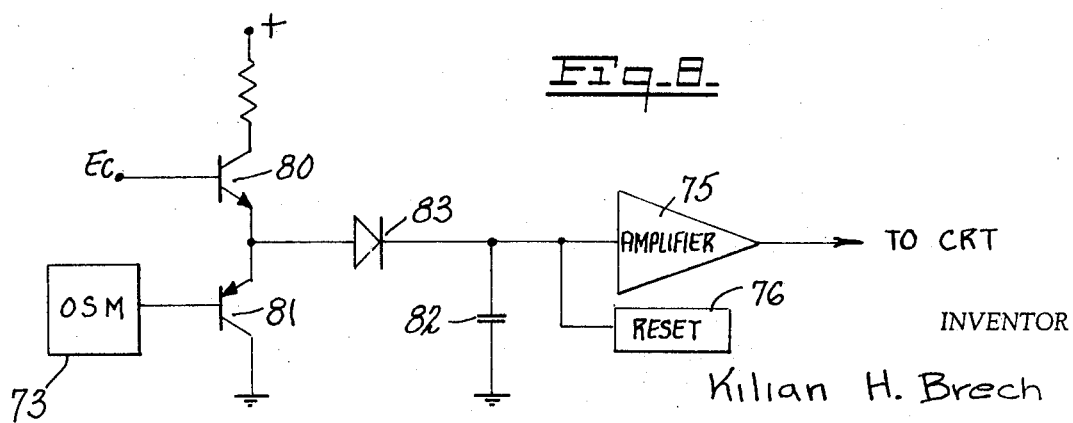

ULTRASONIC THICKNESS GAUGE

This invention relates to gauges, and more particularly relates to ultrasonic thickness gauges and methods of such gauging.

Ultrasonic thickness gauges operate in a manner similar to radar or sonar to measure thickness of materials from one side. An ultrasonic transducer introduces a short burst of sonic energy into a test piece and listens for the return echo from the back surface of the test piece or a discontinuity within the test piece. The characteristics of ultrasonic waves are such that they propagate through a homogeneous media at a given velocity until they strike an acoustic boundary, more commonly called an interface, where they reflect and propagate in a reverse direction at the same speed. This is generally accomplished by converting an electric pulse applied to a piezoelectric transducer into ultrasonic waves and then the returning ultrasonic waves will be converted to an electrical impulse by the transducer. An initial electrical pulse is thus converted into an ultrasonic pulse which traverses the test piece twice and which then generates another electrical impulse some time after the initial impulse. The time lag between the impingement pulse and the return echo is the transit time or round-trip time of the ultrasonic wave. With a knowledge of the velocity of the sonic wave in a known type of material by measurement of the round-trip transit time the thickness may be mathematically determined.

In practice, at the present time, the measured thickness from a test specimen is determined by either a direct meter readout or an oscilloscope readout. In the oscilloscope method, the screen of the CRT is calibrated to read thickness directly. Since each alloy to be measured has different sound velocities, the screen has to be calibrated each time measurements are made on different alloys. This is generally done by taking a known thickness of the alloy in question and adjusting the display unit so that the return echo coincides with the desired marking of the screen. This requires recalibration of the screen for a change in materials.

A more preferred readout for ultrasonic thickness gauges is the direct meter or digital readout. In this method, the transit time is directly converted into a measurable quantity such as a current or voltage. In one technique, the impingement pulse and the return echo are used to initiate and terminate a timing flip-flop which produces a pulse which is equal to the transit time. Then, the pulse width is converted into a voltage and applied to a digital voltmeter for readout of the thickness. A conversion factor must be utilized to provide for adjustment for a given alloy. Another method is to use a transit time pulse to open an electronic gate and then pass through the gate a finite number of oscillations which are counted and displayed on nixie tubes during the duration of the pulse. The frequency of oscillation is adjusted to allow passage of a number of pulses equal to the thickness of the test piece in thousandths of an inch. These methods also require manual adjustments to set conversion factors for different types of material.

In ultrasonic thickness measurements the reflected wave has an initial pulse followed by undesired noise. For accurate measurement of the time between reflected pulses it is quite important that none of the noise be detected and identified as a primary echo pulse. In different materials, dependent on its inherent attenuation factors, surface configuration, etc., the amplitude of the reflected ultrasonic waves may vary considerably, and also the ratio of the amplitude of the primary echo pulse to the following noise. This may require adjustments and re-adjustments in the threshold level of the ultrasonic wave detection circuit to ensure a given sensitivity for detecting the reflected wave in various materials.

In view of the tedious and manual operations required in presently known ultrasonic thickness gauges, this invention provides new and improved ultrasonic thickness gauges having an automatic conversion factor adjustment for various materials.

The present invention also overcomes the aforementioned sensitivity problem through the provision of an automatic threshold control which adjusts the threshold level in accordance with the amplitude of the primary echo to suppress detection of the following noise.

Briefly stated, in one form of the invention, the transit time of a pulse in a test piece is measured by producing a pulse whose width is equal to the transit time. Similarly, a calibrated sample of the same material of known thickness is subjected to an ultrasonic pulse, and a pulse produced whose width is equal to the transit time in the calibration specimen. For each calibration cell, the calibration network gives a different output, thereby altering the conversion factor such that the ultrasonic thickness gauge is always calibrated for direct readout for the type of material of the calibration cell. A direct readout may then be derived from the resulting comparison of the two timing pulses.

An object of this invention is to provide a new and improved ultrasonic thickness gauge.

Another object of this invention is to provide an ultrasonic thickness gauge of the type described with improved means for detecting the thickness of a test piece.

Another object of this invention is to provide a new and improved ultrasonic thickness gauge which is automatically self-calibrating.

A further object of this invention is to provide an ultrasonic thickness gauge having new and improved means for comparing the time duration of the transit time of ultrasonic waves in a test sample and a calibrated specimen to derive from such comparison an accurate measure of the thickness of the test specimen.

Another object of this invention is to provide a new and improved method of utilizing ultrasonic energy to gauge the thickness of an object.

A still further object of this invention is to provide an amplifying arrangement for ultrasonic echo pulses which automatically sets a threshold level in response to the primary echo pulse and is sensitive only to the primary echo and ignores following noise.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, in which:

FIG. 1 is a schematic diagram in block form of apparatus embodying the invention;

FIG. 2 shows diagrams of waveforms in timed relation which occur in the network of the invention;

FIG. 3 is a schematic diagram of a preferred comparison and integrating network;

FIG. 4 shows certain waveforms applied and generated in the amplifier sections of the network of FIG. 1;

FIG. 5 is a schematic diagram of an automatic threshold control network utilized in the invention;

FIG. 6 is a schematic diagram in block form exemplifying the manner in which a cathode ray tube is utilized to provide an automatically calibrated readout;

FIG. 7 is a diagram of the waveforms occurring in the network of FIG. 6, and

FIG. 8 is a schematic diagram of the ramp generator of FIG. 6.

A system embodying the invention is shown in schematic block form in FIG. 1 which will be described with reference to the waveform diagrams of FIG. 2. A clock 10 which preferably takes the form of an asymmetrical free running multivibrator has a wave form A which is applied to a time delay generator 11. Time delay generator 11 may conveniently be a one-shot multivibrator which generates a rectangular wave output B having a shorter time duration than the low level output of the clock. The output of the time delay generator 11 is applied to pulse generators 12 and 13, both of which generate a pulse as shown in wave form C at the end of the timing cycle of time delay generator 11. The output of the pulse generators 12 and 13 are applied to ultrasonic transducers 14 and 15 in a conventional manner. The transducers 14 and 15 are preferably ceramic piezoelectric elements which are in contact with a test specimen S and a calibration specimen C, respectively. The calibration specimen is of predetermined known thickness, and a suitable ultrasonic gel or oil may be disposed between the transducers and the specimens. The output of the pulse generator as shown in waveform C will pulse the transducers and transmit or produce an ultrasonic wave in the specimens S and C which will travel to the interfaces $I_S$ and $I_C$, respectively. The ultrasonic waves will be reflected from the interfaces and impinge on the transducers which will then produce electrical waveforms as shown at C following the initial pulse. Reflection will again occur and the ultrasonic wave will be transmitted to the interfaces and again reflected back to the transducers to repeatedly produce the ringing type waveforms C. Since the two specimens are of the same material the transit time of the ultrasonic wave per unit dimension will be the same. However, the time of round trip of the ultrasonic wave between the transducer and the interface will be proportional to the thickness.

The detected signal from transducers 14 and 15 are applied to amplifiers 17 and 16, respectively, which are of the video type to give a sharp pulse output as shown in waveform D. Outputs of the amplifiers are applied to gates 18 and 19, respectively. Gates 18 and 19 are enabled when other gates 20 and 21 which may be in the form of flip-flops are in a set condition. Reference is again made to FIG. 2. The gating flip-flops 20 and 21 are set when the output of clock 10 goes high which would be at a time $t_1$ after the pulse output of pulse generators 12 and 13. Therefore, gates 20 and 21 will inhibit gates 18 and 19, respectively, until the output of clock 10 goes high at time $t_1$.

The pulses from amplifier 16 passing gate 18 are applied to a timing flip-flop 22. At time $t_2$ the first reflected pulse as shown in wave form D will set flip-flop 22. Then at time $t_3$ the second pulse will reset timing flip-flop 22 and also apply a resetting signal to gate flip-flop 20. When this occurs, gate 18 is inhibited and any other further pulses indicative of the reflected ultrasonic wave will be blocked at gate 18. Gate 18 is thus open during the time $t_1 - t_3$ as shown in waveform E. Flip-flop 22 thus generates a pulse $t_c$ (waveform F) having a time duration equal to the transit time of one round trip ultrasonic wave in the calibration specimen C.

The output of gate 19 is applied to timing flip-flop 23 which operates in a similar manner to produce a pulse $t_s$ (FIG. 3). The time duration of this signal is proportional to the thickness of the test specimen S. Waveform G exemplifies the output of a ramp generator in which a voltage is generated having a value proportional to the duration of pulse $t_c$. This may be done as shown or a saw tooth wave may be generated as hereinafter explained.

Since the time duration of pulse $t_c$ is known, the two pulses may be operated upon to determine the thickness of the test specimen S. This is accomplished in an integrator 25, which will provide an analog voltage to a digital volt meter 26 so that the thickness of specimen S may be directly read out.

Reference is now made to FIG. 3. The output pulse $t_c$ of timing flip-flop 22 is applied to a switch in the form of a transistor 30 which is in circuit with a constant current generator 29 having a calibration adjusting potentiometer 32. Switch 30 is normally conducting and the collector thereof is at ground potential, as is capacitor 31. During the time duration of pulse $t_c$, switch 30 is turned off. Capacitor 31 then charges towards B+ and develops a ramp voltage having a peak value proportional to the time duration of pulse $t_c$. As this voltage increases, transistor amplifier 34 in the form of an emitter follower will generate the same waveform across resistance 35. This will turn on transistor 36 and a voltage will build up across capacitor 37 which is proportional to the peak magnitude of the saw tooth wave across capacitor 31, and as exemplified by the ramp portion of wave form G in FIG. 2.

At this point, consider that the duration of pulse $t_c$ is dependent upon the velocity of the ultrasonic wave in the calibration specimen. Therefore, for calibration specimens of the same thickness but different material, the time $t_c$ may vary. Assume that the calibration circuitry is initially set to measure the thickness of steel with a steel calibration specimen C, and then it is desired to operate on aluminum, using a calibration specimen of the same alloy. The velocity of transmission of ultrasonic wave in aluminum is higher than that of steel. Therefore, the pulse width $t_c$ would be less and more current would be required to charge a capacitance to a given voltage for that width during the lesser pulse duration. The self-calibrating feature of this invention will compensate for these varying velocities of propagation, as hereinafter described.

The voltage $E_c$ appearing across capacitor 37 is applied to the base of a transistor 40. The less the transit time of the ultrasonic wave, the less the value of the voltage across transistor 40 which is in the form of an emitter follower. This will vary the potential at the base 42 of transistor 43, which operates as a current pump. Current flow through transistor 43 will then vary inversely with the potential at the base 42 thereof which is common to the emitter of transistor 40. A constant current, $I_c$, which is inversely proportional to $E_c$ will flow through transistor 43.

A transistor 44 which functions as a normally closed switch is in series with transistor 43. Transistor 44 receives as its input the output pulse $t_s$ of timing flip-flop 22. When pulse $t_s$ is applied to transistor 44, it is rendered non-conductive for the duration of pulse $t_s$. When transistor 44 is conducting, the collector 45 thereof is at ground potential. When transistor 44 is rendered non-conductive thus opening the switch, capacitors 47 and 48 which function as ramp generators begin to charge through diode 49. The rate of charge of the capacitors varies inversely as the voltage $E_c$ which is proportional to the time duration of pulse $t_c$. It will further be apparent that the time of charging of the ramp generator is proportional to the width of pulse $t_s$. Thus, the ramp generators will charge at a rate which is inversely proportional to the time $t_c$ and for length which is equal to $t_s$.

After every cycle of operation, the capacitors 47 and 48 are discharged to ground through transistor 51. Transistor 51 is normally non-conductive and operates as a switch when turned on. Transistor 51 is turned on when a reset signal is applied to normally conductive transistor 52. Such reset signal may be applied by waveform A, FIG. 2 when the waveform first goes low. When a new cycle is initiated, the negative going signal is applied to the base of transistor 52 through a coupling capacitor 53 driving the base of transistor 52 negative to momentarily turn off transistor 52. The voltage at the collector thereof will rise toward B+ which is applied through coupling resistor 54 to the base of transistor 51 which immediately turns on and provides a path to ground for discharge of capacitors 47 and 48. The base of transistor 51 is normally held at ground by capacitor 53 when transistor 52 is conducting. Capacitors 47 and 48 which have discharge to ground through transistor 51 are now reset to act as a ramp generator and detect the peak voltage. For readout purposes, the voltage built up on the ramp generator is applied to an operational amplifier 56 and, hence, to digital readout voltmeter 26.

It will be apparent that the voltage which is detected by the capacitors 47 and 48 is a function of both the width of the calibration pulse $t_c$ and the test specimen pulse $t_s$. The current $I_c$ flowing through transistor 43 varies inversely as the voltage $E_c$ which is applied to transistor 40. This is a measure of the width of the calibration pulse $t_c$. The resultant voltage build up on the capacitors on the ramp generator is a function of the current through transistor 43 and the time transistor 44 is turned off. The time transistor 44 turns off is determined by the width of pulse $t_s$ which is directly proportional to the thickness of the test specimen S.

This may be mathematically stated as follows:
$E_c$ is proportional to $t_c$ where $t_c$ is the round trip time in the calibration specimen.

Then
$$I_c = K/e_c \qquad (1)$$
Where $K$ is a proportionality constant
and
$$t_c = d_c/V_c \qquad (2)$$
Where
$d_c$ is a known thickness of the calibration specimen
$V_c$ is the velocity of the ultrasonic wave in the calibration specimen Then
$$I_c = K^V c/d_c \qquad (3)$$
or
$$I_c = K_1 V_c \qquad (4)$$
Where
$$K_1 = K/d_c$$

Then
$$E_o = K_2 I_c t_s \qquad (5)$$
Where $K_2$ is a time to readout conversion constant
and
$$t_s = d_s/V_s \qquad (6)$$
Where
$t_s$ is the round trip transit time of the ultrasonic wave in the test specimen,
$d_s$ is the thickness of the thickness of the test specimen, and
$V_s$ is the velocity of the wave in the test specimen Then
$$D_o = K_2 V_c d_s/V_s \qquad (7)$$
And
$$E_o - K_2 d_s \qquad (8)$$
When the materials are the same $V_c = V_s$ Assume a calibration specimen of a given thickness ( 0.500 inch) and a test specimen of the same material. If measurements are now to be made on a material having a round trip velocity of only one-half of the first material and a new calibration specimen of this material is used, the control current $I_c$ is reduced to one-half of its previous value. The transit time in the test specimen will double for the same thickness piece.

Since the integrator gives an output $E_o$ proportional to control current $I_c$ and transit time $t_s$ the output stays constant and consequently the same thickness piece, although of different material, indicates the same on the readout.

From equation (5)
$$E_o = K_2 I_c \times t_s$$
Then
$$E_{o1} = K_2 I_c/2 \times 2 t_s$$
and
$$E_{o1} = E_o$$

The range adjustment 39 need only be used where different size calibration specimens may be used, and for most applications is not required.

Accordingly, the present invention provides a self-calibrating ultrasonic thickness gauge which is self-adapting to various types of materials whose thickness is to be measured.

The invention further provides means for more accurately detecting the time between round trip ultrasonic waves in a specimen. FIG. 4 illustrates a series of electrical impulses (waveform H) generated by the transducers after a round trip in the test specimen. Following the initial impulses there may be other waves of sufficient magnitude to trigger amplifiers 16 or 17 and produce extraneous pulses. This is prevented by the arrangement shown in FIG. 5, which exemplifies amplifier 16 or 17.

The waveform H of FIG. 4 is applied to an operational amplifier 60. The output of amplifier 60 is applied to an inverting transistor 61 and, hence, to a video amplifier 62 which will produce the pulse output of waveform J, FIG. 4. Simultaneously, the output of amplifier 60 is applied to an automatic threshold control circuit 63 which comprises an inverting amplifier 64 and a peak detector 65. A voltage divider 66 sets a threshold level to amplifier 64. The peak detector voltage appearing across capacitor 67, is exemplified at waveform K. This waveform is applied through a threshold level adjustment 68 to amplifier 62. The threshold is set to ignore the largest noise N (FIG. 4) and is varied by the automatic threshold control circuit voltage in accordance with the magnitude of the output of amplifier 60. The video amplifier 62 will then produce a pulse (waveform J, FIG. 4) for each primary echo pulse L and will be insensitive to the following noise pulses whose magnitude are a function of the primary echo pulse.

The peak voltage K from the peak detector will occur a time after the primary echo impulse which is determined by the time constant of capacitor 67, resistance 69 and the threshold adjusting resistances 68. Amplifier 62 is arranged to operate as a differential detector and will generate the pulses of waveform J only in response to the primary echo pulse L.

With this arrangement there will always be an accurate generation of the width of the $t_c$ and $t_s$ pulses in the following timing flip-flop.

If desired the thickness of the test specimen may be directly read out on a cathode ray tube where the screen is calibrated in units of dimension without recalibration for different materials. FIG. 6 shows such a system.

The pulse output of amplifier 17 is applied to the vertical deflection circuit of plates 70 of a cathode ray tube (CRT) 71 having a screen 72 calibrated in units of dimension. The display that will appear on the screen is a representation of the pulse output of amplifier 17, and the time between the pulses, as may be represented in waveform C, FIG. 2, is a measure of the round trip transit time of the ultrasonic wave in the test specimen.

If the sweep time of the CRT is made a function of the round trip transit time of the ultrasonic wave in the calibration specimen the thickness of the test specimen may be read directly from the screen of the CRT.

With reference to FIG. 7, the clock waveform goes low and triggers a variable time one-shot multivibrator (OSM) 73, which is distinct from the time delay generator 11 of FIG. 1, OSM 73 is provided with a variable setting 73a to determine its ON or OFF time as the case may be. When OSM 73 is triggered it enables the saw tooth or ramp generator 74 of FIG. 6 to generate the saw tooth or ramp waveform which provides the sweep signal to the CRT through an amplifier 75. The sweep voltage as will hereinafter be made apparent rises at a rate inversely proportional to the voltage $E_c$ and therefore the time $t_c$. During this sweep time shown in full line the pulse output of amplifier 17 is applied to the vertical deflection plates. Therefore the time between these output pulses, which is a measure of the thickness of the test specimen appears as an inverse function of the round-trip transit time in the calibration specimen. The time of the OSM is made variable to permit the sweep of the CRT to begin with an output pulse from amplifier 17.

In FIG. 7 the ramp voltage is also shown in dash-dot line to indicate that the sweep time may vary as a function of $E_c$.

Reference is now made to FIG. 8 which exemplifies the ramp generator 74. A normally conducting transistor 80 acts as a current pump to provide a current inversely proportional to the voltage $E_c$. Current also flows through transistor 81 which is normally ON, but which is turned OFF when the output of OSM 73 goes high. At this time, capacitor 82 will charge through diode 83 at a rate inversely proportional to the voltage $E_c$ and generate the ramp generator voltage shown in FIG. 7. The ramp voltage buildup across capacitor 82 is applied through amplifier 75 to the vertical deflection circuit of the CRT 71.

In this manner, the sweep time of the CRT will be inversely proportional to the voltage $E_c$ and, hence, the time $T_c$. As the transit time in the calibration specimen becomes less the ramp voltage will increase at a faster rate, and as the transit time becomes greater the sweep time of the CRT will be at a lower rate. The transit time of the ultrasonic wave in the test specimen as measured between the successive pulse outputs of amplifier 17 will appear on the calibrated scope as a function of the sweep time of the scope and will provide a direct readout of the thickness of the test specimen.

The circuit of FIG. 8 may be provided with a reset circuit 76, as previously exemplified in FIG. 3, to periodically discharge capacitor 82.

Various other types of readout circuits may be utilized which will furnish an indication or display of a comparison of the two transit times and a resultant indication of the thickness of the test specimen. For example, the two pulses $t_c$ and $t_s$ could be converted to voltages and compared. Also digital counts of the times $t_c$ and $t_s$ could be made and algebraically added to provide a direct readout.

It may thus be seen that the objects of the invention set forth as well as those made apparent from the preceding description are efficiently attained. Other embodiments of the disclosed invention, as well as modifications to the disclosed embodiment may occur to those skilled in the art. Accordingly, the appended claims are intended to cover all embodiments of the invention and modifications of the disclosed embodiments thereof which do not depart from the spirit and scope of the invention.

What is claimed is:

1. An apparatus for measuring the thickness of an object comprising first and second transducers adapted to generate ultrasonic waves and detect reflection of said waves in a test object and an object of known thickness of the same material as the test object, means for exciting said transducers to transmit ultrasonic waves in said objects, means responsive to said transducers for measuring the transit time of an ultrasonic wave in each object, and means for producing an output voltage which varies directly with the transit time of the wave in the test object and inversely with the transit time of the wave in the object of known thickness.

2. The apparatus of claim 1 further including means for generating pulses having a time duration proportional to the transit time of the ultrasonic wave in each object and said means for producing a voltage comprising means for generating a first voltage proportional in magnitude to the duration of the first of said pulses representative of the transit time in the known thickness object, and means for generating a second voltage which varies as a function of the duration of the other of said pulses, and inversely as a function of the first voltage.

3. The apparatus of claim 1 wherein said means for measuring the transit time of the ultrasonic wave comprises means for generating first and second pulses having durations proportional to the transit time in the test object and the known thickness object, respectively, and said means for producing a voltage comprises means for integrating a current inversely proportional to the duration of said second pulse with respect to the time duration of said first pulse.

4. The apparatus of claim 1 wherein said means for measuring the transit time of the ultrasonic wave comprises means for generating a first pulse having a duration proportional to the transit time of an ultrasonic wave in the object of known thickness and a second pulse having a duration proportional to the transit time of an ultrasonic wave in the test object, and said means for producing an output voltage comprises means for generating a first voltage which increases at a constant rate for the duration of said first pulse, and means for generating a second voltage which increases at a rate inversely proportional to said first voltage for a time proportional to the duration of said second pulse, said second voltage providing said output voltage.

5. The apparatus of claim 4 wherein said means for generating a first voltage comprises a constant current source and a capacitor, means for charging said capacitor from said source in the duration of said first pulse, and means for detecting the voltage of said capacitor due to charging thereof.

6. The apparatus of claim 5 wherein said means for producing said second voltage comprises a current source control as an inverse function of said first voltage, a ramp generator, and means for causing said ramp generator to generate a voltage from said current source during the duration of said second pulse.

7. The apparatus of claim 6 further including means for resetting said ramp generator prior to transmission of further ultrasonic waves in said objects.

8. The apparatus of claim 1 further including means for numerically indicating said output voltage in terms of the thickness of said test object.

9. A method of determining the thickness of a metallic object comprising the steps of providing a test object to be measured, providing a reference object of the same material as the test object and having a known thickness, transmitting an ultrasonic wave into each object, measuring the transit time of the ultrasonic wave in each object, generating a signal proportional to the transit time of the wave in the test object, generating a signal proportional to the transit time of the wave in the reference object, providing a cathode ray tube having sweep means and deflection means, and controlling said sweep means as a function of the transit time in the object of known thickness and said deflection means as a function or the transit time in the test object.

10. A method of determining the thickness of a test object comprising the steps of providing a test object to be measured, providing a reference object of the same material of the test object and having a known thickness, transmitting an ultrasonic wave in each object, measuring the transit time of the ultrasonic wave in each object, and generating a signal which is directly proportional to the transit time of the ultrasonic wave in the test object and inversely proportional to the transit time of the ultrasonic wave in the reference object, said signal providing an indication of the thickness of the test object.

11. Apparatus for measuring the thickness of an object comprising first and second transducers adapted to generate ultrasonic waves in the object and an object of known thickness of the same material as the test object, means for measuring the transit time of an ultrasonic wave in each object, and means responsive to said measuring means for deriving a signal which varies inversely with the transit time in the object of known thickness and directly with the transit time in the test object.

12. Apparatus for measuring the thickness of an object comprising first and second transducers adapted to transmit ultrasonic waves in a test object and an object of known thickness of the same material, means for exciting said transducers to transmit ultrasonic waves in said objects, means for measuring the transit time of the wave in the object of known thickness and the transit time of the wave in the object of unknown thickness, a cathode ray tube having sweep means and deflection means, means for controlling said sweep means as a function of the transit time of the ultrasonic wave in the object of known thickness, and means for controlling said deflection means as a function of the transit time of the wave in the object of unknown thickness.

13. The apparatus of claim 12 further including means for generating a signal proportional to the transit time in the object of known thickness, said means for controlling the sweep comprises a ramp generator, and means for controlling the rise time of the signal of said ramp generator as an inverse function of said proportional signal.

14. Apparatus for measuring the thickness of an object as compared to an object of known thickness of the same material comprising means for transmitting ultrasonic waves through the objects, means for measuring the transit time of the waves in each object, and means responsive to said measuring means for providing a signal which varies inversely with the transit time in the object of known thickness and directly with the transit time in the other object.

15. The apparatus of claim 14 further including means for generating pulses having a time duration proportional to the transit time of the ultrasonic wave in each object and said means for producing a signal comprises means for generating a first voltage proportional in magnitude to the duration of the first of said pulses representative of the transit time in the known thickness object, and means for generating a second voltage which varies as a function of the duration of the other of said pulses, and inversely as a function of the first voltage.

16. The apparatus of claim 14 wherein said means for measuring the transit time of the ultrasonic waves comprises means for generating first and second pulses having durations proportional to the transit time in the test object and the known thickness object, respectively, and said means for producing a signal comprises means for integrating a current inversely proportional to the duration of said second pulse with respect to the time duration of said first pulse.

17. The apparatus of claim 14 wherein said means for measuring the transit time of the ultrasonic wave comprises means for generating a first pulse having a duration proportional to the transit time of the ultrasonic wave in the object of known thickness and a second pulse having a duration proportional to the transit time of the ultrasonic wave in the test object, and said means for providing a signal comprises means for generating a first voltage which increases at a constant rate for the duration of said first pulse, and means for generating a second voltage which increases at a rate inversely proportional to said first voltage for a time proportional to the duration of said second pulse, said second voltage providing said signal.

18. The apparatus of claim 17 wherein said means for generating a first voltage comprises a constant current source and a capacitor, means for charging said capacitor from said source in the duration of said first pulse, and means for detecting the voltage of said capacitor due to charging thereof.

19. The apparatus of claim 18 wherein said means for producing said second voltage comprises a current source controlled as an inverse function of said first voltage, a ramp generator, and means for causing said ramp generator to generate a voltage from said current source during the duration of said second pulse.

20. The apparatus of claim 19 further including means for resetting said ramp generator prior to transmission of further ultrasonic waves in said objects.

21. The apparatus of claim 14 further including means for numerically indicating said output signal in terms of the thickness of said test object.

* * * * *

FO-1050
(5/69)

UNITED STATES PATENT OFFICE
CERTIFICATE OF CORRECTION

Patent No. 3,688,565            Dated September 5, 1972

Inventor(s) Kilian H. Brech

It is certified that error appears in the above-identified patent and that said Letters Patent are hereby corrected as shown below:

Column 5, line 46, delete "discharge" and substitute therefor -- discharged --. Column 6, line 28, delete "$D_o$" and substitute therefor -- $E_o$ --. Column 10, line 7, delete "or" and substitute therefor -- of --.

Signed and sealed this 6th day of March 1973.

(SEAL)
Attest:

EDWARD M. FLETCHER, JR.           ROBERT GOTTSCHALK
Attesting Officer                Commissioner of Patents